US010377925B2

(12) United States Patent
Schubert et al.

(10) Patent No.: US 10,377,925 B2
(45) Date of Patent: Aug. 13, 2019

(54) ADHESIVE MATERIAL WITH CARBON MATERIAL AND METHOD FOR ITS PRODUCTION AND USE

(75) Inventors: Tim Schubert, Bayreuth (DE); Tomas Meinen, Pullach i. Isartal (DE); Christian Zenkel, Bamberg (DE)

(73) Assignee: FUTURECARBON GMBH, Bayreuth (DE)

( * ) Notice: Subject to any disclaimer, the term of this patent is extended or adjusted under 35 U.S.C. 154(b) by 371 days.

(21) Appl. No.: 13/984,594

(22) PCT Filed: Feb. 10, 2012

(86) PCT No.: PCT/EP2012/052280
§ 371 (c)(1),
(2), (4) Date: Oct. 21, 2013

(87) PCT Pub. No.: WO2012/107548
PCT Pub. Date: Aug. 16, 2012

(65) Prior Publication Data
US 2014/0034231 A1    Feb. 6, 2014

(30) Foreign Application Priority Data
Feb. 10, 2011    (DE) .................. 10 2011 010 924

(51) Int. Cl.
*C09J 175/00*    (2006.01)
*C09J 11/04*    (2006.01)
(Continued)

(52) U.S. Cl.
CPC ............. *C09J 11/04* (2013.01); *C09J 5/06* (2013.01); *C09J 175/04* (2013.01); *H01B 1/24* (2013.01);
(Continued)

(58) Field of Classification Search
CPC . C09J 175/04; C09J 11/04; C09J 5/06; C08K 3/04
See application file for complete search history.

(56) References Cited

U.S. PATENT DOCUMENTS

2010/0038025 A1\* 2/2010 Keite-Telgen-Buscher ................. C09J 7/0203 156/272.2
2010/0261002 A1\* 10/2010 Tajima ............... C08G 18/6216 428/323
(Continued)

FOREIGN PATENT DOCUMENTS

EP    2062926 A1    5/2009
EP    2336263 A1    6/2011
(Continued)

OTHER PUBLICATIONS

CarboDis Water-based CNT Dispersion. "Future Carbon" Technology Flyer Aug. 2017.\*
(Continued)

*Primary Examiner* — Michael L Leonard
(74) *Attorney, Agent, or Firm* — Dilworth IP, LLC

(57) ABSTRACT

The present invention relates to an adhesive material, especially an electrically and/or thermally and/or radiation-curing or curable adhesive material, having at least one adhesive constituent and/or adhesive matrix, and moreover having at least one additive in the form of a carbon material, especially based on carbon nanomaterials and/or carbon micromaterials, present in the adhesive constituent and/or adhesive matrix. The invention further relates to a method for producing, activating and/or curing an adhesive material. Finally the invention also relates to a method for adhesively bonding two substrates.

7 Claims, 5 Drawing Sheets

(51) Int. Cl.
*C09J 5/06* (2006.01)
*H01B 1/24* (2006.01)
*C09J 175/04* (2006.01)
*C08K 3/04* (2006.01)
*C08K 7/06* (2006.01)

(52) U.S. Cl.
CPC ............... *C08K 3/04* (2013.01); *C08K 7/06* (2013.01); *C08K 2201/011* (2013.01)

(56) References Cited

U.S. PATENT DOCUMENTS

| | | | | |
|---|---|---|---|---|
| 2010/0273008 | A1* | 10/2010 | Burckhardt | B60J 10/0071 428/423.1 |
| 2011/0178232 | A1* | 7/2011 | Yoshino | C09J 11/04 524/565 |
| 2011/0233479 | A1* | 9/2011 | Korzhenko | C08K 3/04 252/511 |

FOREIGN PATENT DOCUMENTS

| | | | | |
|---|---|---|---|---|
| EP | 2594613 | A2 | 5/2013 | |
| JP | 2010195671 | A | 9/2010 | |
| WO | WO-2004097853 | A1 * | 11/2004 | ............ B82Y 10/00 |
| WO | 2006136715 | A1 | 12/2006 | |
| WO | 2007029934 | A1 | 3/2007 | |
| WO | WO 2009147415 | A1 * | 12/2009 | ......... C08G 59/5033 |
| WO | 2010038484 | A1 | 4/2010 | |
| WO | 2010066730 | A1 | 6/2010 | |

OTHER PUBLICATIONS

Sahoo at al. "Polymer nanocomposites based on functicnalized carbon nanotubes", Progress in Polymer Science 35 (2010) pp. 837-867.
International Search Report for PCT/EP2012/052280, dated May 9, 2012, 2 pages
Office Action issued in European Application No. 12705095.3 dated Jul. 14, 2017.

* cited by examiner

Evaluation Table

| CNT conc. | Heating behavior (°C/min) Microwave | | | Adhesion behavior | | | | |
|---|---|---|---|---|---|---|---|---|
| | P = 20% | P = 30% | P = 40% | Stove | | Microwave 40% power | | |
| | | | | Without clamping force | With clamping force | Without clamping force | With clamping force | |
| 0% | 3.0 | 5.2 | 6.4 | moderate | good | moderate | very good | |
| 0.5% | 3.5 | 4.7 | 6.6 | moderate | - | good | very good | |
| 1.0% | 4.3 | 5.7 | 7.3 | - | very good | | | |

Fig.5

ADHESIVE MATERIAL WITH CARBON MATERIAL AND METHOD FOR ITS PRODUCTION AND USE

The present invention firstly relates to an adhesive material. Furthermore, the invention also relates to a method for producing an adhesive material, a method for activating and/or curing an adhesive material and a method for adhesively bonding two substrates.

Adhesive systems of the type stated at the beginning are known in the most varied of forms in the prior art. However, the adhesive systems currently used still have insufficient electrical conduction or microwave absorption, to be utilizable industrially for the curing process. Or alternatively electrically conductive additives must be added in such proportions that this has a marked adverse effect on the adhesive properties.

Therefore the problem to be solved by the present invention is to provide solutions by means of which in particular a curing process as described above can be realized.

This problem is solved according to the invention by certain adhesive materials, methods for producing adhesive materials, methods comprising activating or curing adhesive materials, and bonding methods as defined in the independent claims. Further features and details of the invention can be seen from the dependent claims, the description, the examples and the drawings. Moreover, features and details that are described in connection with a particular aspect of the invention of course always also apply in their entirety with respect to the disclosure in connection with the other respective aspects of the invention, and vice versa.

According to the present invention, in particular, adhesive materials are created that can be thermally activated and/or cured. This means that these adhesive materials can be activated and/or cured by means of a thermal effect. This can be achieved in various ways, so that the invention is not restricted to concrete exemplary embodiments. For example, the thermal effect can be realized by radiation, for example microwave radiation.

Furthermore, it is also conceivable to activate/cure the adhesive materials thermally by the action of UV or infrared radiation.

These adhesive materials are also designated hereinafter as radiation-curing or activatable. In another embodiment it is possible for the thermal effect to be induced by an electric current.

This can take place by direct contact of the layer via metallic, possibly flat contact strips, or else contactlessly by the action of the magnetic field of an induction coil operated with alternating current, which in its turn generates currents in the conductive adhesive, which heat the adhesive resistively.

Adhesive materials of this kind are also designated hereinafter as electrically curing or activatable.

Preferably, therefore according to the present invention, the adhesive material is or can be subjected to thermal curing/activation. The necessary energy can be supplied for example electrically/resistively, or via radiation, for instance microwave radiation.

According to the present invention, radiation-curing adhesive materials in particular are created. Furthermore, adhesively bonded joints can be produced, in particular with an electrically-curing and/or radiation-curing adhesive material, for example for use in the automobile sector or the like.

In particular, electrically-curing and/or radiation-curing adhesive based on carbon nanoparticles is provided. In this case the invention is not limited to particular carbon nanoparticles.

According to the present invention, basically any form of carbon material can be used. According to the present invention it is therefore envisaged that the additive is in the form of a carbon material. In another embodiment it can preferably also be envisaged that the additive is in the form of a dispersion, predispersion or the like, which has a carbon material. In the case of a dispersion, the additive is preferably in a matrix material.

The adhesive systems currently used still have insufficient electrical conduction or microwave absorption for this to be able to be used industrially for the curing process. Or else they contain such large amounts of conductive additives that the adhesive action is impaired.

The fundamental feature of the present invention is precisely to create this precondition through the use of suitable additives. However, these additives should not have an adverse effect on the adhesive action. The materials used as additive are mainly special carbon preparations, for example with MWNTs (multiwalled carbon nanotubes) as basic functional carrier, which preferably are incorporated in the adhesive by various dispersion techniques.

According to the first aspect of the invention, an adhesive material, especially an electrically and/or thermally and/or radiation-curing or curable adhesive material, is provided, having at least one adhesive component and/or adhesive matrix, and furthermore having at least one additive present in the adhesive component and/or adhesive matrix in the form of a carbon material, especially based on carbon nanomaterials and/or carbon micromaterials.

Preferably the additive can be configured in the form of a carbon material, which is microwave-absorbing and/or based on CNT and/or based on a CNT-containing mixture of various carbon materials and/or is predispersed.

Preferably the adhesive material can have, as additive in the form of a carbon material, CNTs at a concentration of greater than 0.2 wt %.

Moreover, it is preferable for the adhesive material to have at least one further additive, especially at least one hardener and/or another carbon-containing material and/or soluble CNT granules.

Basically any combinations of the following materials are also conceivable. Not all constituents have to be present simultaneously. Preferably, however, they always include a carbon material constituent and/or a CNT-containing constituent and a basic adhesive constituent. The aforesaid materials are

- Basic adhesive constituent. In the case of PU adhesives this is the polyol component
- Hardener constituent, for example polyisocyanates in the case of PU adhesives
- Other additional constituents, for example liquid polyesters in the case of hot-melt adhesives
- CNT dispersion, preferably aqueous or in solvents, optionally stabilized
- Carbon material-containing dispersion, preferably aqueous or in solvents, optionally stabilized
- CNT granules, optionally stabilized for good dispersibility Furthermore, it is preferable for the adhesive material to have one or more of the features stated in the claims, the description, the examples or the figures.

The adhesive materials to be used, which in particular form the adhesive component and/or the adhesive matrix, can be PU-based adhesives. However, these adhesives are only to be regarded as examples. Generally the principle of adding CNTs carbon materials as microwave absorbing additives to an adhesive, so that this is then cured in a microwave field, is applicable for a great many thermally hardening adhesives in liquid form. Furthermore, so-called hot-melt adhesives, i.e. adhesives that are solid before being melted, can be provided with CNT additives, and then also activated in the component by microwave absorption.

Further important aspects are in particular the possibility of improving the adhesive action with CNT additives and/or microwave curing compared to CNT-free systems and/or conventional curing; removal of the adhesive effect by melting again in the microwave field/switchability of bonding and detachment, also final inactivation of the adhesive by corresponding overheating in the microwave field; the electrical conductivity of the adhesive after curing, which goes beyond purely antistatic applications; the binding of possibly harmful moisture owing to the high binding capacity of carbon nanotubes (as an option).

The special feature relative to existing solutions, for instance with metallic components, for electrical microwave-supported adhesive curing is in particular that owing to the special absorption properties of the CNT-containing systems with good dispersion, only small additions of additive are required and the basic properties of the adhesives are preserved particularly well. An improvement in the adhesive properties relative to a CNT-free adhesive system has been documented for several combinations of materials.

According to another aspect of the invention, a method of producing an adhesive material, especially an adhesive material according to the invention as described above, is provided and is characterized in that an adhesive component and/or adhesive matrix of adhesive material is provided, and in that an additive in the form of a carbon material, especially based on carbon nanomaterials and/or carbon micromaterials is incorporated, in particular is dispersed and/or mixed-in and/or distributed in the adhesive component and/or adhesive matrix.

Preferably the additive is or will be predispersed in the form of a carbon material, in particular in an aqueous or organic solution.

Preferably at least one further additive is added, especially a hardener and/or another carbon-containing material and/or soluble CNT granules. With respect to the preferred materials and combinations of materials, reference is also made to the above disclosure in its entirety.

Preferably the method can have one or more process step(s) stated in the claims, the description, the figures or the examples.

According to another aspect, an adhesive material, especially an adhesive material according to the invention as described above, is provided, which has been or can be produced according to a method according to the invention as described above.

According to another aspect, a method for activating and/or curing an adhesive material, especially an adhesive material according to the invention as described above and/or a carbon material that has been produced by a method according to the invention as described above, is provided, characterized in that this is activated and/or cured electrically and/or thermally and/or based on radiation.

Preferably the adhesive material is activated and/or cured by applying an electrical voltage.

Preferably the adhesive material is activated and/or cured by being exposed to radiation, especially microwave radiation.

Preferably the adhesive effect of the adhesive material can be removed by repeat thermal treatment of the adhesive material, for example by melting it again, preferably in a microwave field.

According to yet another aspect, a method for adhesively bonding two substrates, especially using an adhesive material according to the invention as described and/or produced above, is provided, characterized in that the adhesive material is applied on the first and/or second substrate and/or is interposed between the two substrates, in that the two substrates are brought together and in that the adhesive material is activated and/or cured, especially by a method according to the invention as described above.

A substrate is generally a component or structural element. Preferably the substrate has a support, for instance a backing or base for something else. In another embodiment a substrate can also be said support.

However, as in the other aspects of the invention as well, the adhesive action and/or microwave curing relative to CNT-free systems and/or conventional curing can be improved with carbon additives, especially CNT additives.

Preferably the adhesive effect can be reduced or even removed by repeat melting or partial melting, for example in a microwave field.

It is preferably envisaged that owing to the possibility of melting, especially temporary melting, switchability of bonding and detachment can be produced.

For example it is also possible that final inactivation of the adhesive can be achieved, for example through corresponding overheating, for instance in the microwave field.

Moreover, electrical conductivity of the adhesive can be achieved, especially after curing, which goes beyond purely antistatic applications.

Binding of possibly harmful moisture can also be achieved owing to the high binding capacity of the carbon material, especially of carbon nanotubes.

Preferably the methods according to the invention described above can have one or more process step(s) stated in the claims, the description, the figures or the examples.

In the invention represented by the various aforementioned aspects, preferably carbon nanomaterial can be used as carbon material. For example this can be or can be used in the form of carbon nanotubes. Carbon nanotubes (CNTs) consist in particular of closed graphene layers rolled up into a cylinder. Individual tubes are called "single wall carbon nanotubes" (SWCNTs), particles of concentrically stacked tubes of increasing diameter are called "multiwall carbon nanotubes" (MWCNTs). CNTs can be produced by various methods. The best known are the arc process, the laser ablation technique and the catalytic chemical vapor deposition (CCVD). This last-mentioned method is suitable for large-scale production of CNTs. In this case the CNTs form from gaseous carbon suppliers (hydrocarbons, alcohols, CO, $CO_2$) on metallic, catalytically active substrates. Commercially available SWCNTs have diameters of 0.5-4 nm, MWCNTs have diameters in the range of 6-100 nm. CNTs can be up to several mm in length. The physical properties of CNTs correspond largely to those of graphite along the basal planes. CNTs are now used as mechanical reinforcement, electrically and thermally conducting additive in polymers, ceramics and metals. For this purpose, the CNTs are often chemically modified on their surface in order to meet the requirements of good dispersibility and bonding to the matrix. As a rule the CNTs are added to the matrix material. Owing to the high aspect ratio and the large specific surface, only composites with relatively low CNT content can be prepared.

In another embodiment the carbon nanomaterial can be in the form of carbon nanofibers. Carbon nanofibers (CNFs) consist of graphene layers that are stacked on one another along the filament axis. The angle (the orientation) of the graphene planes with respect to the filament axis is adopted for coarse differentiation. Accordingly, so-called 'herringbone' CNFs possess graphene planes that are arranged at an angle ≠90°. These CNFs can either be solid or also hollow. Their diameters are in the range of 50 nm-1 µm and their lengths can be up to millimeters. In the case when the graphene layers are arranged at an angle=90° to the filament axis, they are called 'platelet' CNFs. Their diameters are in the range of 50 nm-500 nm and their lengths can be up to 50 µm. These CNFs are as a rule produced by CVD. Their applications are mainly in catalysis as catalyst supports and as active additives in Li-ion batteries or in gas storage.

Carbon particles, for example carbon nanoparticles, e.g. carbon nanotubes (CNTs) have special electrical, thermal and mechanical properties. Thus, CNTs have very high electrical conductivity, which can reach the range of metallic conductivity. The thermal conductivity of CNTs can theoretically also be up to 6000 W/m·K. CNTs have extreme mechanical properties. For example, tensile strengths and elastic moduli are reached that can correspond to 1000 times the values reached for steel. Therefore carbon nanoparticles are of considerable interest as additives in various matrix materials for improving electrical conductivity, thermal conductivity, mechanical properties and much else besides, in the chemical industry, in machine construction, in the automobile industry, in the aerospace industry as well as in medical engineering and other branches of industry.

By using CNT dispersions, the heating rates in the microwave field can be further increased by a factor of 2-3 and the attainable final temperatures can be increased.

With increasing power, the positive aspect of the CNTs decreases owing to the self-heating of the matrix system, the heating rates do not increase in proportion to the microwave power introduced and become less dependent on the proportion of CNTs. The system thus has a tolerant reaction to locally excessive proportions of CNTs or inadvertently excessive microwave power, which is a fundamentally technically useful self-limitation of the system.

The following fundamental technologies can preferably be used in connection with the present invention:

For example, heating can take place by electrical resistance heating. By applying an electrical voltage to a conductive material, by means of the electrical resistance of the material, current can be converted to heat, so that it is possible to activate thermally crosslinking systems. The heating power depends both on the respective surface resistance and on the applied electrical voltage, i.e. the current that is flowing. In the case of electrically heated layers, apart from the conductive material used, in addition the layer thickness plays a role, as the conductivity increases until a certain volume conduction value is reached, depending on the layer thickness. Another important value is the percolation limit, which must be reached or exceeded, for the conductive particles in the matrix to form a current-conducting network. For contacting the applied heatable layer, commercially available metallic contact strips can be used, which are fitted before applying the layer. To ensure uniform heating-through of the layer—i.e. uniform heating —, on the one hand the layer thickness must be as constant as possible and on the other hand the contact strips must be arranged parallel to one another. As a result, "current paths" of equal length form between the electrodes, with identical conduction values, thus ensuring a uniform flow of current in the whole layer. In order to ensure a small transfer resistance or contact resistance, the contact strips are preferably incorporated in the material and so can only be removed from the components again at considerable expense. For this reason permanence of the electrode strips in the respective component should also be considered.

Another form of heating can be by means of a microwave field. Basically, in particular four possible reactions of a material or a sample to microwave radiation are possible.

Firstly, the sample can be permeable to microwaves, which is usually the case with electrical insulators. Furthermore, it can reflect the radiation, or it can interact with the electric or magnetic field. In contrast to conventional methods of heating, in which heat is supplied to the material or test specimen indirectly from outside by radiation, convection or conduction of heat, in microwave heating, heat is produced directly within the sample. This also reverses the temperature gradients that are usual in conventional heating processes, i.e. the material is heated from the inside. If a substance is able to interact either with the magnetic or electrical portion of the microwave radiation, it can be heated thereby, with different mechanisms being important for conductors and dielectrics.

Conductive and inductive heating takes place in electrically conducting materials. In conductive heating, the oscillating electrical portion of the field generates a current in the material, which in its turn heats the sample by ohmic losses. In inductive heating, the oscillating electric field is produced by the magnetic field portion of the microwave radiation acting from outside. The resultant circulating currents give rise to the heating. It should be noted that through field displacement, the field lines are located on the surface of the test specimen and the depth of penetration is of the order of magnitude of only $10^{-6}$ m for metallically conducting materials. In materials with moderate to good conduction, such as in the case of the CNT-containing adhesive systems, the radiation penetrates into the whole volume of the adhesive film.

If the dielectric is polar, which is the case for example with water, the randomly distributed elementary dipoles can be oriented by the external field, which is called orientation polarization (maximum in the range 105-109 Hz, but also effective in the frequency range used). Owing to the water content of many adhesives—especially before curing, this mechanism is also relevant for the heating process.

A good review of microwave radiation, especially absorption mechanisms and interaction between matter and electromagnetic fields, is given for example in "T. Gerdes. Mikrowellensintern von metallisch-keramischen Verbundwerkstoffen [Microwave sintering of metal-ceramic composites]—Dissertation, Fortschrittsberichte VDI, Düsseldorf, 1996". The content of this disclosure is hereby incorporated in the disclosure of the present patent application.

In the case of a mixture, for example a dispersion of CNTs in a solvent, a resin, a polymer or the like, there are local differences in gradient of the electric field, of the electrical conductivity and/or local differences in absorption behavior, which can lead to differences in the degree of heating.

In the low-temperature range, the conducting constituents of the mixture mainly contribute to the heating; the matrix constituent, if transparent to microwaves or less strongly absorbing, is then heated indirectly by the conducting particles, which causes anisotropic heating. Through good dispersion of the CNTs, and spontaneous transmission of the heat produced owing to the good thermal conductivity of the additives used, as a rule there is, however, rapid and efficient homogenization of the temperature in the adhesive film. If a limited field strength, therefore a heating rate that is not too rapid, is made possible for this temperature equalization, so-called "hot spots" can be avoided completely.

It the concentration of CNTs is increased, the heating properties can be improved as a result of reaching the percolation threshold. When the threshold is exceeded there is a marked increase in the conductivity of the mixture, whereas the depth of penetration of the MW radiation decreases. Below the percolation threshold, the absorption behavior of the individual particles is decisive for the heating, whereas now—in addition—there is absorption of the microwaves with respect to the whole communicating system. The behavior of the depth of penetration during heating is dependent on the materials; thus, the conductivity of carbon increases with increasing temperature, so that the depth of penetration decreases. However, for additive-bonded joints that have only a small film thickness, this is not a technologically relevant limitation. For heating processes, the optimum with respect to the heating behavior is generally in a region that has high electrical conductivity, but once again not too high, so that a limited depth of penetration does not only heat the surface of the body.

In the case of microwave heating of various adhesive systems, it should be noted that many adhesives are not transparent to microwaves, i.e. even without the CNT constituent, dissipation and heating of the adhesive occurs. To make this industrially useful for a curing process and to speed it up, it is advantageous to add constituents with strong absorption of microwave radiation, such as CNTs.

In anticipation of the results described in the following, it can be stated, to summarize, that
- it is feasible to add carbon-based, microwave-absorbing materials to the adhesives,
- carbon nanotubes in particular are suitable for this,
- there is rapid and efficient heating in the microwave field,
- this heating leads to the desired curing of the adhesive,
- industrial application is feasible for microwave-based adhesive curing using said additives.

The invention is now described below with preferred embodiments, also referring in particular to the accompanying drawings. These show FIG. 1 various CNT-containing adhesive systems;

FIG. 2 the schematic structure of a microwave belt dryer for carrying out methods according to the invention;

FIG. 3 the absolute temperature profile in various heating tests;

FIG. 4 the plot of the heating over a defined period of time; and

FIG. 5 an evaluation table.

As an example, various investigations for dispersion of CNTs in an adhesive matrix of a PU-based adhesive are described below—as a first embodiment, not limiting the whole invention. The investigations were carried out as follows:
1. Preparation of reference samples (without CNTs) the following are adhesive-bonded:
   PC ABS (polycarbonate/acrylonitrile-butadiene-styrene copolymer)
   Planware thin (leather) as top material
2. Improved dispersion of the CNTs
3. Surface-modified CNTs for improved dispersion
4. Incorporation of redissolving CNT granules for further improvement of the dispersion of the CNTs in the adhesive
5. Testing dispersants
6. Incorporating various CNT concentrations, for example 0.5 wt %, 1.0 wt %, 1.5 wt %, 2.0 wt %, 2.5 wt %, 3.0 wt %.
7. Use of Carbodis, i.e.: predispersed, stabilized CNT dispersions, for better dispersion of the CNTs in the adhesive.

The results of the dispersion tests showed, firstly, that, at times, the CNTs used, regardless of the respective mixture ratio, could only be incorporated in the adhesive with difficulty and still showed agglomerates even when using established mixing technologies. These mixing difficulties could be attributed to the fact that even after preliminary purification, CNTs are still rather to be regarded as hydrophobic, which greatly hampers dispersion for example in diols.

A further improvement of dispersion could be achieved in such cases by transmitting high shearing forces to the CNT agglomerates in the highly viscous systems, so that the agglomerates are distributed more finely in the adhesive matrix.

In order to improve the dispersibility of the CNTs in the matrix, further tests were carried out with dispersants, but the viscosity of the adhesives/CNT system increased further as a result. This increase can be attributed to the better distribution of the CNTs in the matrix, as finely-divided CNTs possess extraordinary binding capacity for liquids.

The question of viscosity has an influence on homogeneous dispersion of CNTs in solvent and matrix systems: depending on the dispersion techniques used, the transmission of shearing forces improves with increasing viscosity. As a result of corresponding shearing of CNT agglomerates, this can result in successive comminution of the latter and can lead to homogeneous distribution of the CNTs in the adhesive. On the other hand if the viscosity is too high, processability can again be more difficult and functionality of the adhesive may be poorer; it is thus a parameter requiring optimization.

In the sense of the binding capacity of the CNTs described and of the viscosity increase, by adding surface-oxidized CNTs, starting from a concentration of 1.5 wt % CNTs a better distribution—determined optically—could be achieved. In this case the adhesive became highly viscous.

The results for processability of the adhesive mixtures with the various proportions by weight are presented below.
- 0.5 wt %, low viscosity
- 1.0 wt %, low viscosity
- 1.5 wt %, can still be processed well
- 2.0 wt %, upper limit
- 2.5 wt %, no longer free-flowing
- 3.0 wt %, no longer free-flowing A very good distribution could be achieved by adding soluble CNT granules, which have good dispersibility primarily in aqueous systems. The additive used for this is a granulated product dispersible in polar systems, which is characterized by an especially low agglomeration tendency (in contrast to "conventional" CNTs). However, in the concrete case a surfactant contained herein has an electrically insulating action in the total system, so that at higher concentrations the electrical resistance of the adhesive increases, which prevents electrical curing of the samples. In the end, all attempts to introduce CNTs in the adhesive system in powder form led to at least moderately homogeneous distribution of the CNTs, or else they did not display sufficient electrical conductivity owing to the insulating effect of the surfactant used (in the case of soluble granules, when these contain surfactants of that kind). According to the present invention it is possible in particular to disperse CNTs directly in the adhesive. For example, the CNTs can be used in powder form. Preferably, predispersed CNTs can be used, which in particular are easier to handle.

For these reasons, in the present invention the further new approach was also adopted, which operates with already excellently dispersed CNTs in aqueous or organic or solvent-based media.

Several corresponding products were used. FIG. 1 shows CNT-containing adhesive systems with an improved quality of dispersion through the use of CarboDis materials. The CarboDis materials are aqueously predispersed CNTs.

The greatest success in dispersing the CNTs was achieved by means of CarboDis TA. CarboDis TA is a dispersion of anionically stabilized CNTs, which can be easily metered. There was no difficulty with compatibility between hardener and the water-containing dispersion for the previously prepared CNT dispersion that was used.

Various tests were conducted for electrical curing, which were carried out as follows:
1. Sample processing:
knife-coating of the adhesive
drying for 20 min at 40° C.
crosslinking for 20 min at 80° C.
2. Measurement of resistance and electrical curing with prepared mixtures (adhesive/CNT/hardener) on contacted sample plates The results of the investigations with respect to electrical curing of the adhesive matrix were as follows:

The plates coated with the adhesive/CNT/hardener mixture were contacted on two opposite sides with copper metal strips and the respective resistances were measured with a digital multimeter. The respective values are presented below.

|  | Specific resistance |
|---|---|
| Adhesive without CNTs | 844 Ω cm |
| Adhesive with 0.5% CNTs | 705 Ω cm |
| Adhesive with 1.0% CNTs | 677 Ω cm |
| Adhesive with 1.5% CNTs | 654 Ω cm |
| Adhesive with 2.5% CarboGran | 741 Ω cm |
| Adhesive with 3.5% CarboGran | 770 Ω cm |
| Adhesive with 1% surfactant and 1.5% CNTs | 728 Ω cm |
| Adhesive with 40% CarboDis TA (at 2.5% CNTs and 2.5% surfactant), equivalent to CNT content in adhesive: 1% | 600 Ω cm |

Then a voltage of 80 V was applied to the contacts, in order to cure the adhesive.

Next, various tests—as second embodiment—were carried out for microwave curing.

The tests for heating the test specimens were carried out in a microwave arrangement provided with a conveyor belt (microwave belt dryer), as is used in a larger version in industrial processes for drying products. The constituents of the device, their function and the schematic structure of the microwave belt dryer can also be seen in FIG. 2.

FIG. 2 shows the schematic structure of a microwave belt dryer 10. This has a magnetron 11, a waveguide coupling 12, a directional coupler 13, a circulator 14, a tuner 15, a water load 16, a detector diode 17 and a cavity 18 with product load.

This device 10 produces microwave radiation with a frequency of 2.45 GHz and a maximum power of 2 kW. The sample travels through the applicator on a Teflon-coated belt and in this way is resident in the electromagnetic field for 30 seconds per pass. When the sample leaves the cavity 18, its temperature can be measured by means of an infrared thermometer. The microwave radiation is produced in a magnetron 11.

In addition, a tuning unit 15 is incorporated, for optionally carrying out adjustment of the field and thus maximizing the power absorbed by the sample. The applicator receives the product to be heated, the load, and, in addition to its process tasks, optionally reactor, furnace and the like, it is also adjusted for electromagnetic requirements, for example resonator.

In the microwave belt dryer 10 used, a belt on which the samples have been placed passes through the applicator. Preliminary tests on the heating behavior were carried out in an adapted, steplessly adjustable laboratory microwave device.

Various tests were carried out into how an adhesive material as described above can be activated and/or cured.
1. Sample Processing:
knife-coating of the adhesive
optionally, clamping the sample in the pressing plates
2. Microwave Drying at Different Powers, Nominal Total Power (3.2 kW):
CNT Concentration [wt %]
0
0.5
1.0
Power Level [%], Relative to 3.2 kW
20
30
40

Results of investigations with respect to microwave-supported curing of the adhesive matrix were as follows.

As preparation for the belt microwave, preliminary tests for microwave-supported curing were carried out with a laboratory microwave device. This already allows stepless power adjustment. Different CNT concentrations (0 wt %; 0.5 wt %; 1.0 wt %) were tested in conjunction with the PU-based adhesive with the power levels P=20%; P=30%; P=40% (corresponding to 640 W, 960 W, 1280 W).

It was found that at a low power input in the microwave field, the CNTs bring about—as an interim result—a respectable temperature increase of the matrix system within the short heating time and therefore cure the adhesive.

In the last step, using CNT dispersions, this interim result was raised to a far better level, by increasing the heating rates further by a factor of 2-3, so that the attainable final temperatures were increased.

With increasing power, the positive aspect of the CNTs decreases owing to the self-heating of the matrix system; the heating rates do not increase in proportion to the microwave power introduced and become less dependent on the CNT component. The system thus has a tolerant reaction to locally excessive proportions of CNT or inadvertently excessive microwave power, which is basically a technically useful self-limitation of the system.

The total energy consumption required for curing the adhesive by microwaves can be lowered considerably by means of carbon-containing additives, especially CNTs.

Figure 1:
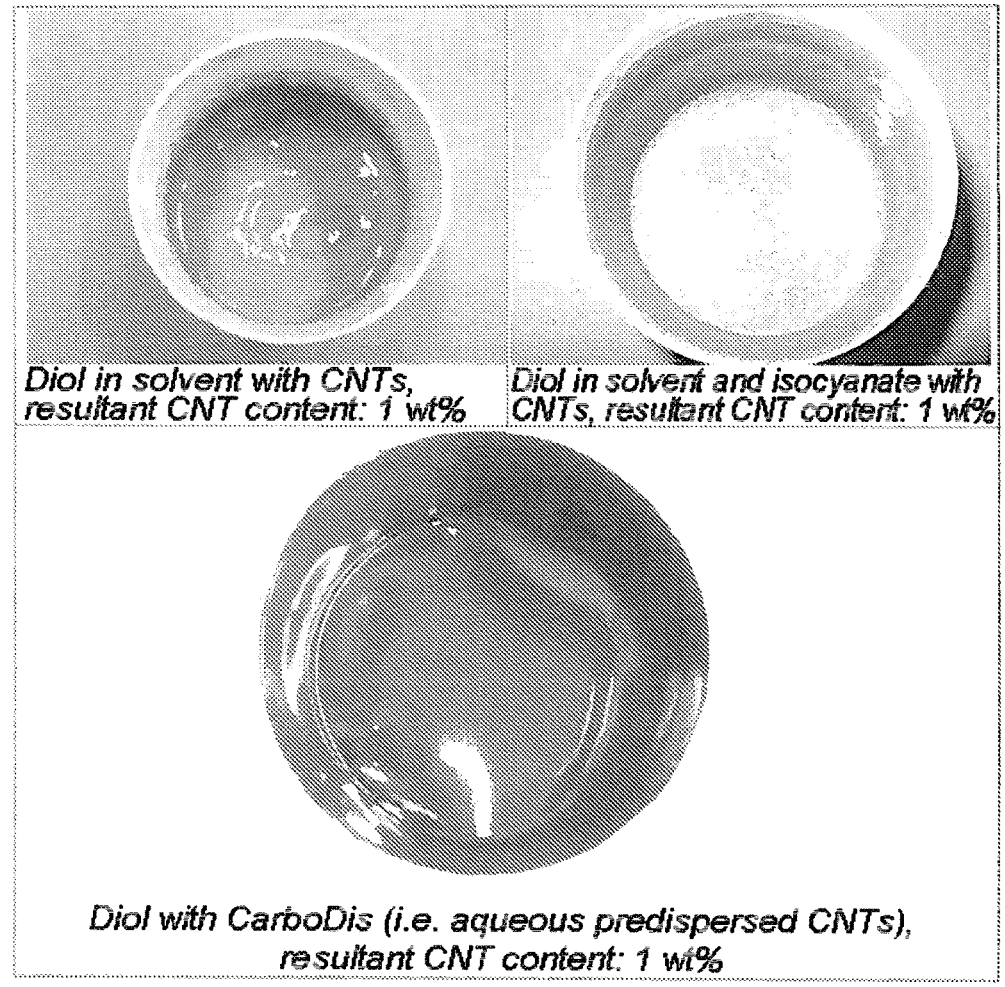
Figure 2:
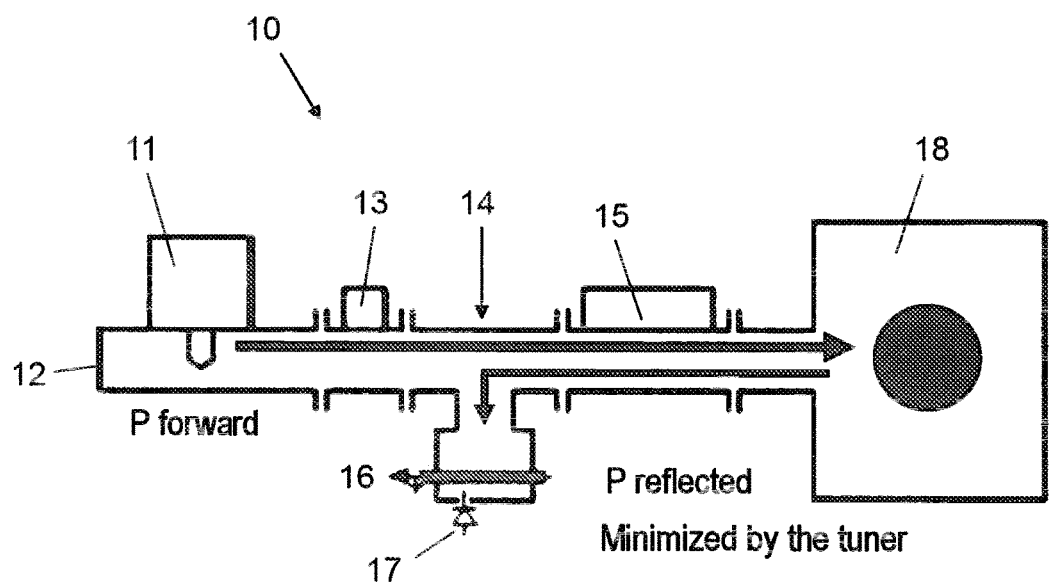
Figure 3:
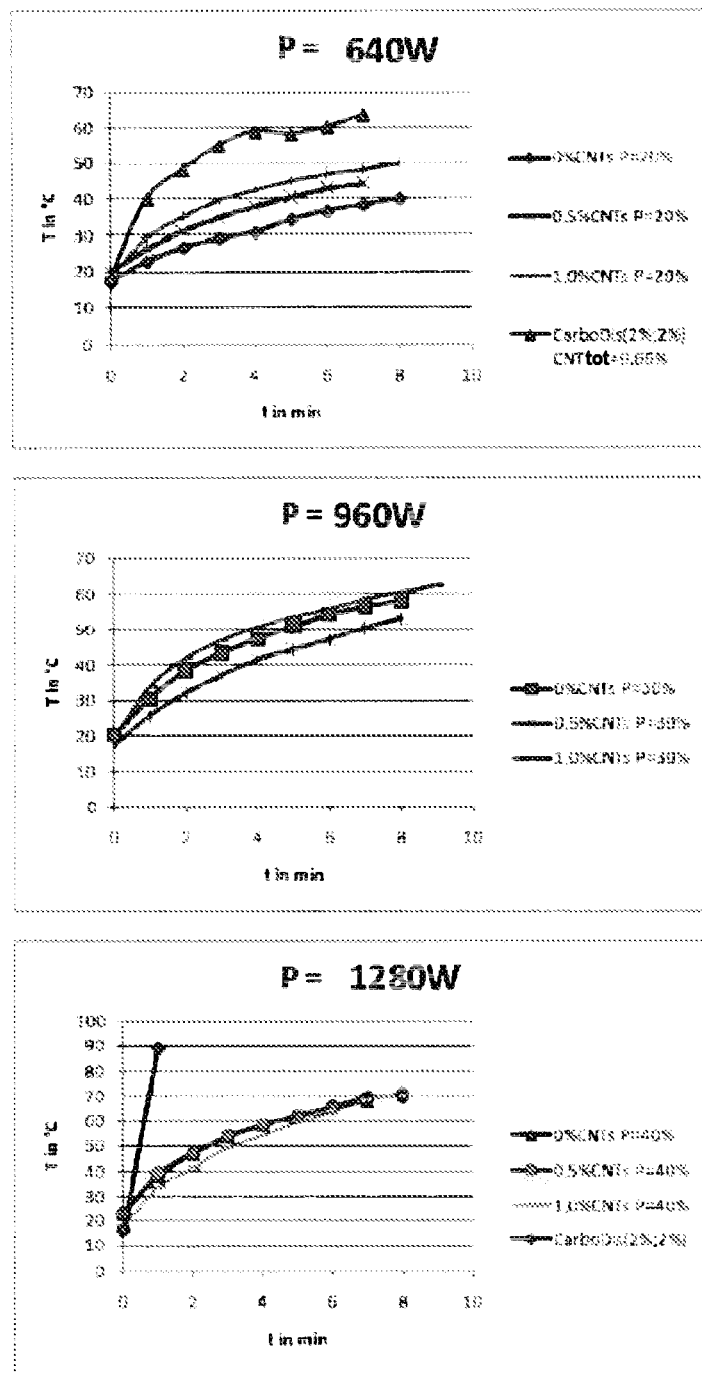
FIG. 3 shows the absolute temperature profile (temperature in ° C.) of the heating tests of the adapted adhesive in the microwave field at different powers.
Figure 4:
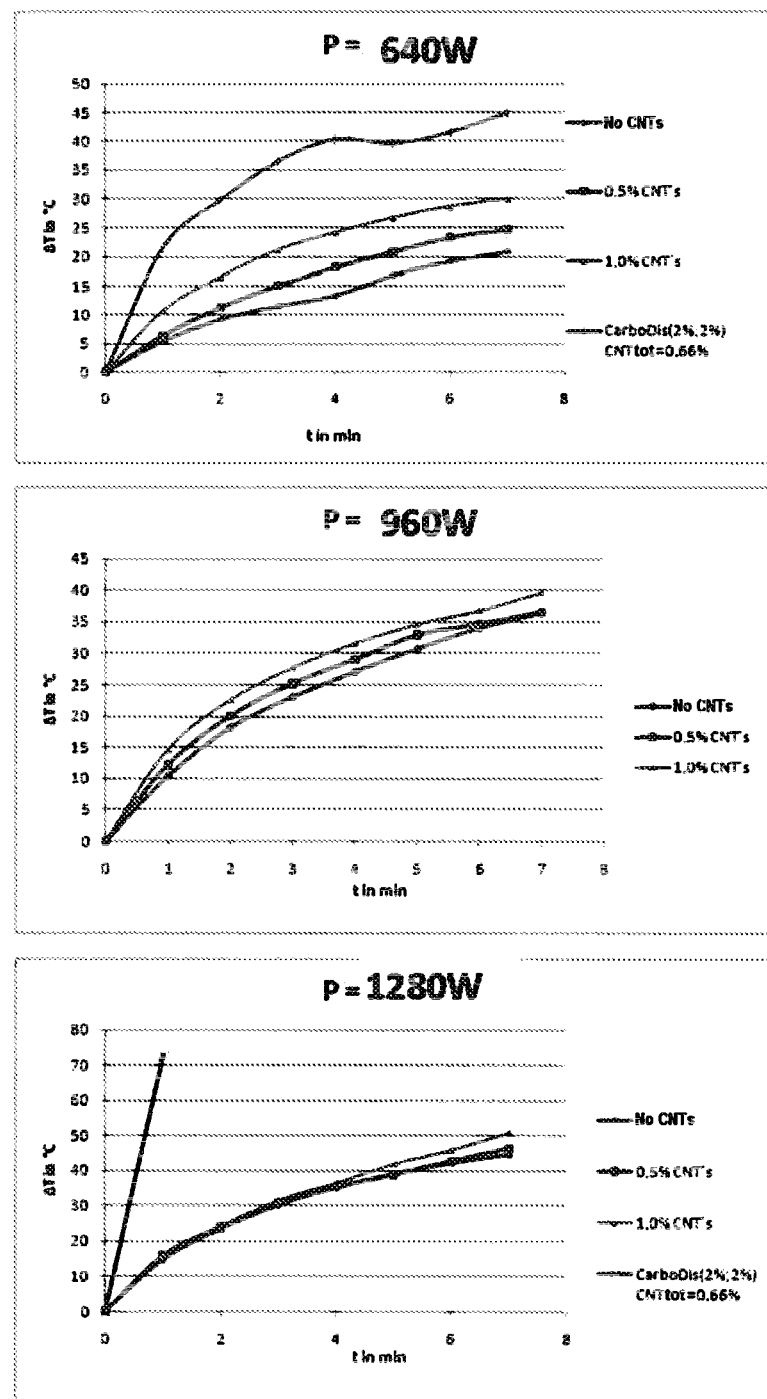
FIG. 4 shows the heating (temperature difference ΔT) plotted against the time period covered—the temperature before heating was taken as reference (=0).

The diagrams shown here (absolute temperature T or temperature difference ΔT as a function of the heating time) describe the adhesive system for a PU adhesive used in the test. Two different PU adhesives were used. There are no large differences between the two PU adhesives tested.

The adhesive dispersions were prepared and cured under the same conditions. The samples were then subjected to curing tests in the belt microwave, which offers the possibility of a continuous process, in each case with and without the clamping force. It became clear that curing in the microwave, even without an applied clamping force, brings about very good adhesive bonding, which can be even further improved by applying the defined pressure. A corresponding evaluation table is shown in FIG. 5.

Then various adherence samples were prepared.

The adhesive dispersion was prepared as follows:
weighing the adhesive
adding the hardener
mixing by spatula
weighing the CarboDis TA (2.5% CNTs/2.5% surfactant)
  =adding the CarboDis TA while stirring
homogenizing/deaerating Coating and curing took place as follows:

As the coating tests by knife-coating had better reproducibility than application with existing spraying equipment, the adhesive was knife-coated in all cases. However, spray application does not in principle pose any problem on an industrial scale.

The samples were predried for 5 min at 30° C., so that the additional water that was introduced with the CarboDis was dried out again. Curing took no more than 5 minutes in the belt microwave at nominally approx. 1200 W (with reduced application amount, within 5 minutes 30 seconds).

The tests and results as described above in their general form and in the form of the two aforementioned embodiments can be summarized as follows.

First, a breakthrough was achieved with microwave heating of CNT-containing adhesive systems. It was successfully shown that by using carbon materials, especially carbon nanotubes (CNT), as additives in adhesive systems, it is possible for adhesive-bonded joints to be cured in a microwave field: carbon-based, microwave-absorbing materials can be added to the adhesives using suitable mixing technologies. In particular, carbon nanotubes, and CNT-containing mixtures of various carbon materials, are suitable for this, owing to the extraordinary absorption properties with respect to electromagnetic radiation. The high electrical conductivity of the CNTs and other carbon materials, but especially the attainment of electrical percolation in the adhesive system even with small proportions of additives, is decisive for success. Rapid and efficient heating takes place in the microwave field for the adhesive systems with additives, and this also applies to thin films of adhesive, with only a small total mass (of the order of 0.5-2 $g/dm^2$) of the unhardened adhesive. Especially with high quality of dispersion (optimal distribution of the additive in the adhesive system), high but controllable heating rates can be achieved in microwave-induced heating. The resultant heating of the adhesive in the microwave field can effect the desired curing. Curing is uniform, and incompletely cured weak spots/zones can be avoided. Focusing the heating process on the adhesive-bonded joints alone can give clear advantages in terms of energy. The processability of the adhesives can be preserved. According to the results obtained so far, the adhesive action is not in any way impaired by the additives used, and is fully maintained. Furthermore, electrical conductivity of the adhesive-bonded joint is achieved, which is advantageous for avoiding static charges.

A key result of the present invention is that a solution for microwave-based curing of adhesives that is suitable for industrial application is feasible using the aforementioned additives—all relevant principles for achieving this have been found and developed in the context of the present invention.

An essential aspect is the quality of dispersion of the additive in the adhesive.

The initial results showed that there is dependence of the conductivity and of the homogeneous microwave coupling on the addition of CNTs. This generally already applies with simple addition, which for CNT contents of approx. 2 wt % leads into the range of incipient percolation. However, the effect was further increased considerably, after uniform distribution of the CNTs in the matrix—and therefore complete electrical percolation—was achieved. The microwave tests carried out showed that it is possible, by adding CNTs, for the present adhesive system to be cured even at low powers, and the desired effects, heating by microwaves, and the further accelerated heating by addition of CNTs, are obtained. In this case it was advantageous in particular to use predispersed CNT dispersions. The improvements could be achieved by preliminary dispersion of the CNTs in a water surfactant mixture (incorporating an aqueous dispersion) (CarboDis), which was already supplied to the adhesive in this form. This gave a mixture that is good with respect to manageability and functioning.

The key point of the present invention is the method of curing by microwave, as this allows particularly uniform coupling to all available particles.

Furthermore, it was found that the quality of the adhesive bond was slightly improved by microwave irradiation, relative to stove tests carried out for comparison.

An essential result of the present invention is that it is possible for microwave curing to be used instead of the existing method, offering several advantages over the existing process (process time, heating of only the adhesive-bonded joint, energy aspects and so on). To summarize, the present invention shows high potential for converting the adhesive curing process to a microwave process. Preferably there is in particular shortening of process times, as primarily only the adhesive-bonded joint is heated, and consequently there are no long cooling times, of tools for instance (prior transmission of heat and clamping force). The heating itself can take place without any problem in the single-digit minutes range, which also already includes the cooling phase.

The invention claimed is:

1. An adhesive material comprising at least one adhesive constituent, adhesive matrix, or both in which one additive in the form of an aqueous carbon nanotube dispersion is dispersed within the adhesive material, wherein the aqueous carbon nanotube dispersion is stabilized with an anionic surfactant, wherein the carbon nanotubes are present in the adhesive material at a concentration of between 0.5 wt % and 3.0 wt %, and wherein the adhesive material is cured by microwave radiation or a combination of microwave radiation and thermal curing.

2. The adhesive material of claim 1 wherein the adhesive constituent or adhesive matrix is polyurethane-based.

3. The adhesive material of claim 1 wherein the carbon nanotubes are multiwalled carbon nanotubes (MWNTs).

4. The adhesive material of claim 1 wherein the adhesive constituent or adhesive matrix is a hot melt adhesive.

5. The adhesive material of claim 1 further comprising a hardener.

6. The adhesive of claim 1 wherein the carbon nanotubes are present in the adhesive material at a concentration of between 0.5 wt % and 2.0 wt %.

7. The adhesive of claim 1 wherein the carbon nanotubes are present in the adhesive material at a concentration of between 0.5 wt % and 1.5 wt %.

\* \* \* \* \*